(12) United States Patent
Toda et al.

(10) Patent No.: US 7,717,507 B2
(45) Date of Patent: May 18, 2010

(54) HEAD RESTS

(75) Inventors: Shigeyoshi Toda, Anjo (JP); Fumitoshi Akaike, Nisshin (JP); Seiya Nishimura, Okazaki (JP); Tomokazu Moriyama, Toyota (JP); Kiyoka Matsubayashi, Aichi-ken (JP); Koji Aoki, Nagoya (JP)

(73) Assignees: Toyota Boshoku Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 341 days.

(21) Appl. No.: 11/285,770

(22) Filed: Nov. 22, 2005

(65) Prior Publication Data

US 2006/0279114 A1  Dec. 14, 2006

(30) Foreign Application Priority Data

Nov. 26, 2004  (JP) ............................. 2004-342561

(51) Int. Cl.
*B60N 2/42* (2006.01)
*A47C 7/36* (2006.01)

(52) U.S. Cl. .................................. 297/216.12; 297/406

(58) Field of Classification Search ............ 297/216.12, 297/408, 391, 407, 403, 406
See application file for complete search history.

(56) References Cited

U.S. PATENT DOCUMENTS

| 4,762,367 | A | * | 8/1988 | Denton ........................ 297/409 |
| 5,020,855 | A | * | 6/1991 | Lindberg et al. ............. 297/391 |
| 5,694,320 | A | * | 12/1997 | Breed ........................... 701/45 |
| 5,822,707 | A | * | 10/1998 | Breed et al. .................... 701/49 |
| 6,082,817 | A | * | 7/2000 | Muller ................... 297/216.12 |
| 6,088,640 | A | * | 7/2000 | Breed ........................... 701/45 |
| 6,196,579 | B1 | * | 3/2001 | Bowers et al. ............... 280/735 |
| 6,213,548 | B1 | * | 4/2001 | Van Wynsberghe et al. ...................... 297/216.12 |
| 6,402,195 | B1 | * | 6/2002 | Eisenmann et al. ......... 280/735 |
| 6,607,242 | B2 | | 8/2003 | Estrada et al. |
| 6,623,073 | B2 | * | 9/2003 | Schafer et al. ......... 297/216.12 |
| 6,746,078 | B2 | * | 6/2004 | Breed .................... 297/216.12 |
| 7,070,235 | B2 | * | 7/2006 | Schilling et al. ....... 297/216.12 |
| 7,073,856 | B2 | * | 7/2006 | Akaike et al. .......... 297/216.12 |
| 7,145,263 | B2 | * | 12/2006 | Nathan et al. ............... 307/10.1 |

(Continued)

FOREIGN PATENT DOCUMENTS

JP        7-67744        3/1995

(Continued)

*Primary Examiner*—David Dunn
*Assistant Examiner*—James Alex
(74) *Attorney, Agent, or Firm*—Patterson, Thuente, Skaar & Christensen, P.A.

(57) ABSTRACT

A head rest of a vehicle seat may include a head support portion for supporting a head of a passenger, and a drive unit for moving the head support portion. The drive unit has a moving mechanism that is arranged and constructed to move the head support portion toward and away from the passenger head, an actuator for actuating the moving mechanism, a load detecting device that can detect a load applied to the actuator and generate a control signal representative of the detected load, and a controller that can control the actuator so as to control the moving mechanism. The controller controls the moving mechanism so as to move the head support portion toward the passenger head. The controller controls the moving mechanism based on the control signal so as to stop the motion of the head support portion.

2 Claims, 6 Drawing Sheets

U.S. PATENT DOCUMENTS

| | | | |
|---|---|---|---|
| 7,284,793 B2 * | 10/2007 | Kluhspies et al. | 297/216.12 |
| 2003/0090133 A1 * | 5/2003 | Nathan et al. | 297/217.3 |
| 2005/0280304 A1 * | 12/2005 | Akaike et al. | 297/391 |
| 2006/0071518 A1 * | 4/2006 | Hippel et al. | 297/216.12 |
| 2006/0226688 A1 * | 10/2006 | Terada et al. | 297/391 |
| 2006/0279114 A1 * | 12/2006 | Toda et al. | 297/216.12 |
| 2007/0246989 A1 * | 10/2007 | Brockman | 297/391 |
| 2007/0257528 A1 * | 11/2007 | Akaike et al. | 297/216.12 |

FOREIGN PATENT DOCUMENTS

| | | |
|---|---|---|
| JP | 8-187139 | 7/1996 |
| JP | 2534540 | 4/1997 |
| JP | 2665983 | 10/1997 |
| JP | 11-334439 | 12/1999 |
| JP | 2000-233713 | 8/2000 |
| JP | 2004-122856 | 4/2004 |

* cited by examiner

HEAD RESTS

BACKGROUND OF THE INVENTION

1. Field of the Invention

The present invention relates to head rests of vehicle seats. More particularly, the present invention relates to head rests of vehicle seats that can increase restraint performance for heads of passengers when a vehicle collision is sensed or predicted.

2. Description of the Related Art

A head rest of a vehicle seat that can increase restraint performance for a head of a passenger when a vehicle collision is sensed or predicted is already known. Such a head rest (an active head rest) is taught, for example, by Japanese Laid-Open Patent Publication Number 11-334439.

In the known head rest, a head rest main body is arranged and constructed to be tilted or inclined. When a vehicle collision (in particular, a back-side collision) is predicted or sensed by a sensor, the head rest main body is tilted, based on a signal from the sensor, so as to move toward the passenger head. As a result, the head rest main body moves closer to the passenger head so that the passenger head can be reliably supported by the head rest main body. Thus, the passenger can be prevented from suffering a whiplash injury.

Typically, the head position of the passenger sitting on the vehicle seat differs somewhat depending on the body type and the body size of the passenger. Therefore, in the known head rest, the head rest main body is not always appropriately positioned relative to the passenger head. That is, the head rest main body cannot be previously adjusted so as to be appropriately adjacent to and aligned with the passenger head. In addition, during a vehicle collision, the head rest main body is tilted over a predetermined angle range regardless of the body type and the body size of the passenger. Consequently, when a vehicle actually collides, often times, the passenger head cannot be suitably held by the tilted head rest main body. This means that the passenger cannot be sufficiently prevented from suffering a whiplash injury.

SUMMARY OF THE INVENTION

It is, accordingly, one object of the present invention to provide improved head rests for a vehicle, in particular, to provide head rests that can achieve a good holding performance when the vehicle is applied with an impact.

For example, in one aspect of the present invention, a head rest of a vehicle seat may include a head support portion for supporting a head of a passenger, and a drive unit for moving the head support portion. The drive unit has a moving mechanism that is arranged and constructed to move the head support portion toward and away from the passenger head, an actuator for actuating the moving mechanism, a load detecting device that can detect a load applied to the actuator and generate a control signal representative of the detected load, and a controller that can control the actuator so as to control the moving mechanism. The controller controls the moving mechanism so as to move the head support portion toward the passenger head. The controller controls the moving mechanism based on the control signal so as to stop the motion of the head support portion.

According to the head rest thus constructed, the head support portion can be easily positioned in an optimal position relative to the passenger head without utilizing detectors that can detect when the head support portion contacts or comes closer to a passenger head. Therefore, the passenger head can be suitably held by the head support portion when a vehicle collides.

Optionally, the head support portion is moved away from the passenger head over a desired distance after the head support portion is stopped.

In this case, the head support portion can be prevented from pressing the passenger head. Therefore, the passenger can normally be prevented from suffering discomfort.

Other objects, features and advantages of the present invention will be readily understood after reading the following detailed description together with the accompanying drawings and the claims.

DETAILED DESCRIPTION OF THE INVENTION

A representative example of the present invention has been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

A detailed representative embodiment of the present teachings is shown in FIG. 1 to FIG. 7.

Figure 1:
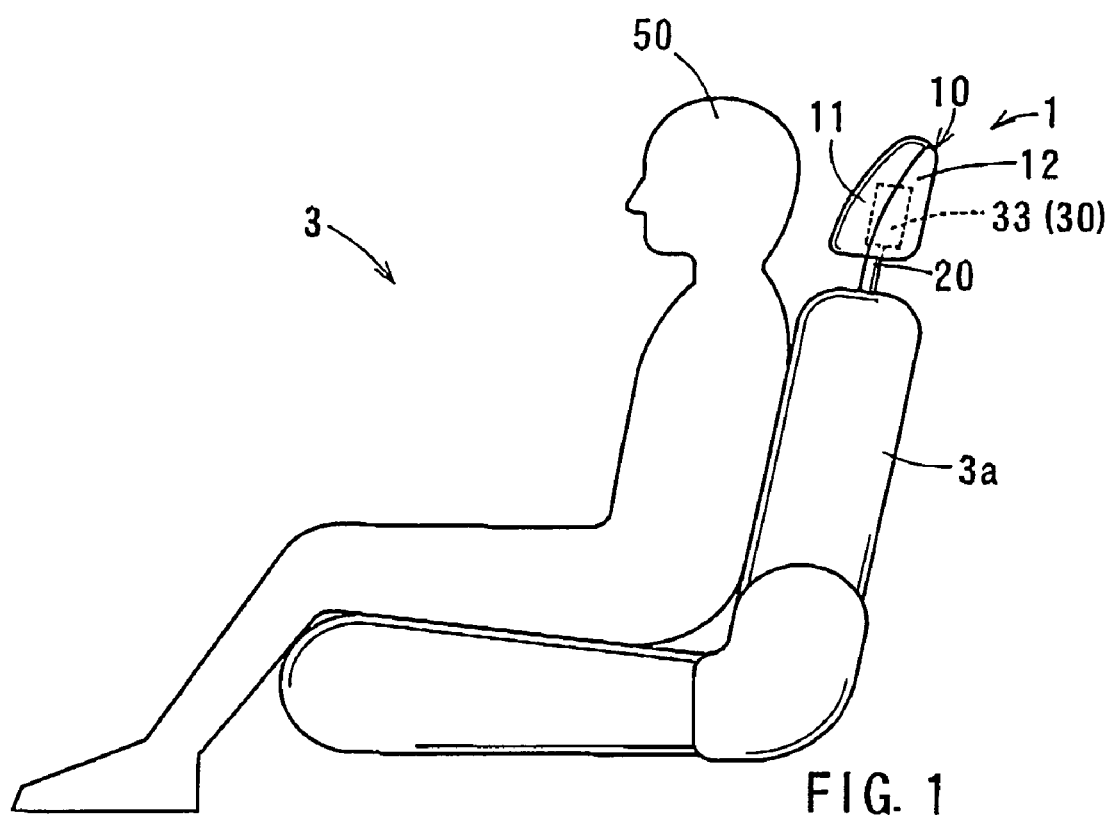
FIG. 1 is a side view of a vehicle seat having a head rest according to a representative embodiment of the present invention, in which a passenger sits on the vehicle seat.
Figure 6:
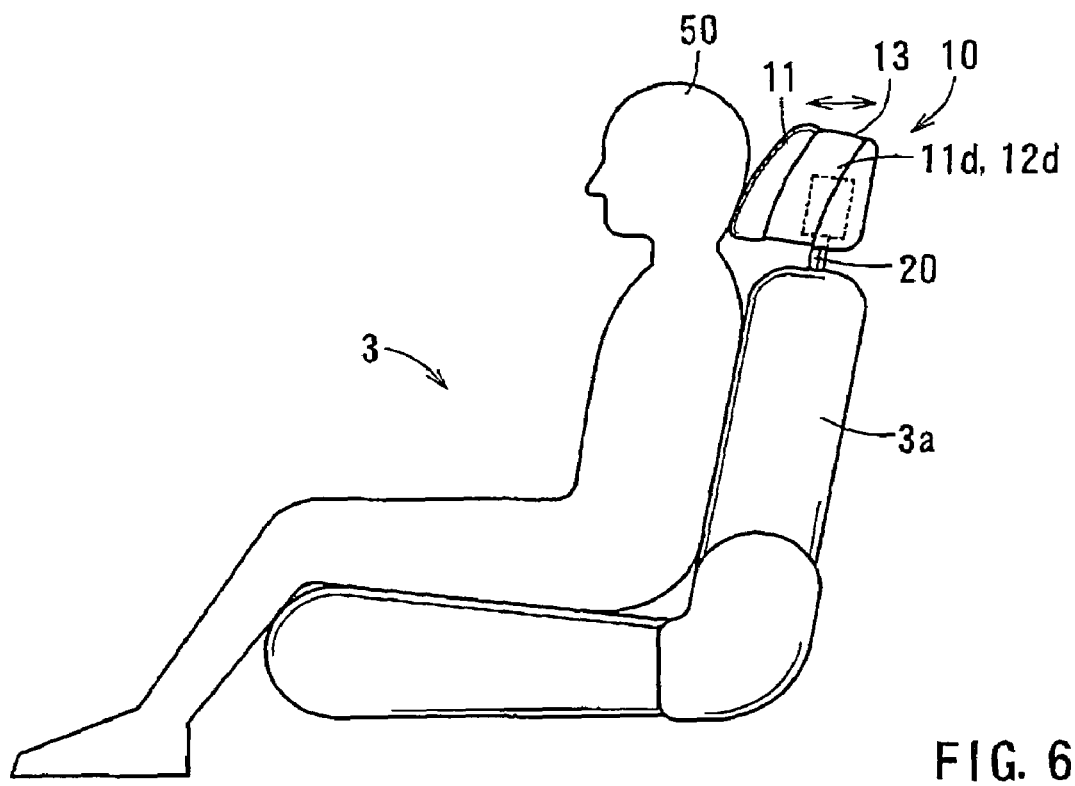
FIG. 6 is a side view similar to FIG. 1, illustrating a condition in which the front portion contacts a head of the passenger.
Figure 7:
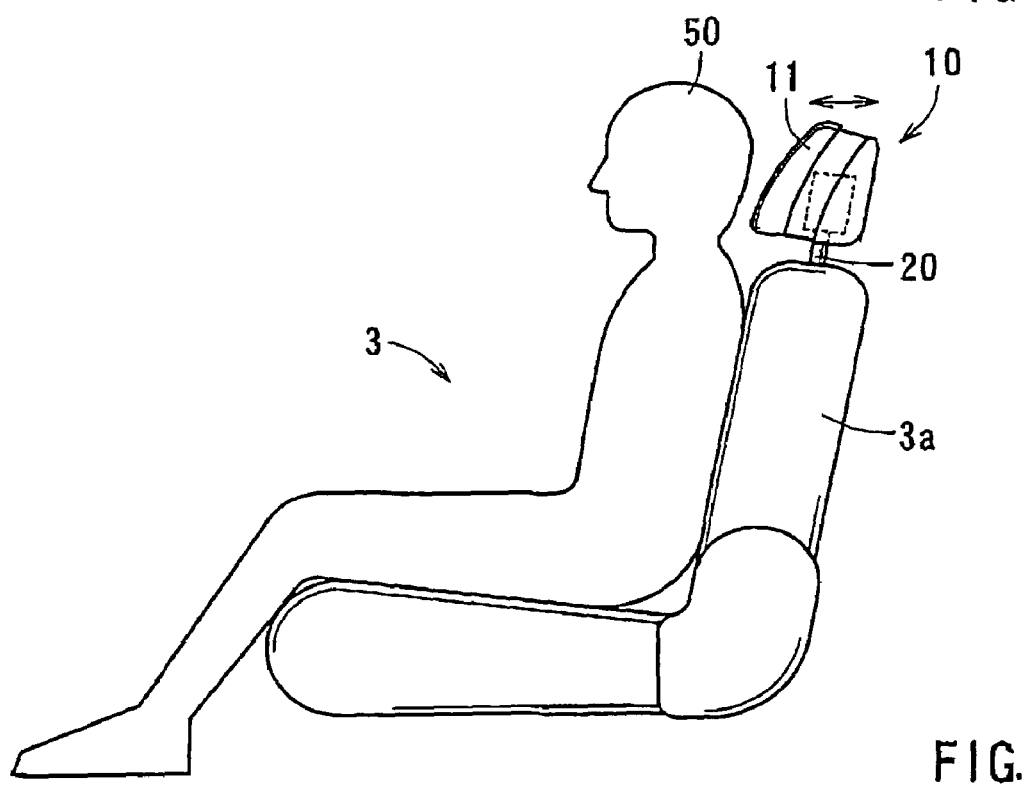
FIG. 7 is a side view similar to FIG. 6, illustrating a condition in which the front portion 11 is positioned in an optimal position relative to the passenger head.

As best shown in FIGS. 1, 6 and 7, a representative head rest 1 (an active head rest) includes a main body 10 and a pair of head rest stays 20 coupled to the main body 10. The head rest stays 20 are vertically movably connected to a seat back 3a of a vehicle seat 3 so that the head rest 1 (the main body 10) is movably attached to the seat back 3a. The main body 10 is composed of two portions, i.e., a relatively immovable rear portion 12 (i.e., a base portion or a first portion) that is coupled to the head rest stays 20, and a movable front portion 11 (i.e., a head support portion or a second portion) that can support a head 50 of a passenger sitting on the vehicle seat 3. Typically, the head rest stays 20 are connected to a known vertical moving mechanism (not shown) that is disposed or embedded in the seat back 3a. Therefore, the head rest stays 20 can vertically move relative to the seat back 3a upon actuation of the vertical moving mechanism so that the height of the head rest main body 10 can be vertically changed or adjusted in order to correspond to the passenger head 50.

Figure 2:
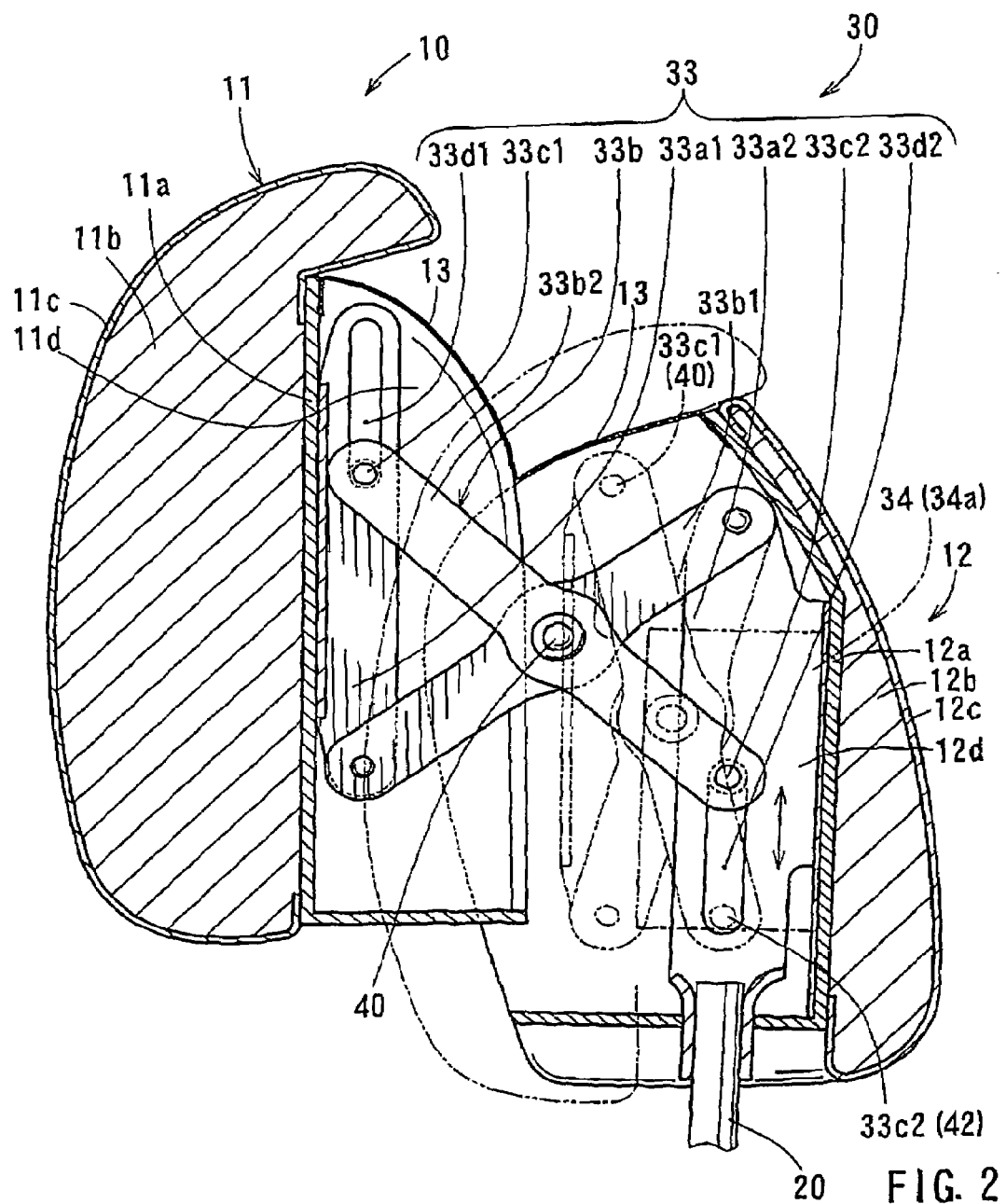
FIG. 2 is a side view of the head rest, which schematically illustrates the motion of a moving mechanism for moving a front portion relative to a rear portion.

As shown in FIG. 2, the rear portion 12 includes a plate-shaped rear brackets 12a, a rear shell 12c having a rear cushion pad 12b, and rear side shield members 12d that are integrally provided to the rear bracket 12a. The rear bracket 12a may preferably be made from resins. The rear bracket 12a is secured to the head rest stays 20. The rear shell 12c is attached to the rear bracket 12a while interleaving the rear cushion pad 12b. The rear shell 12c may preferably be made from leather, cloth or other such materials. The rear cushion pad 12b may preferably be made from urethane foam or other such materials. Conversely, the front portion 11 includes a plate-shaped front bracket 11a, a front shell 11c having a front cushion pad 11b, and front side shield members 11d that are integrally provided to the front bracket 11a. Similar to the rear bracket 12a, the front bracket 11a may preferably be made from resins. The front shell 11c is attached to the front bracket 11a while interleaving the front cushion pad 11b. Similar to the rear shell 12c, the front shell 11c may preferably be made from leather, cloth or other such materials. Also, the front cushion pad 11b is made from urethane foam or other such materials.

Further, the main body 10 additionally includes a cover sheet 13 that is overlaid on the front and rear side shield members 11d and 12d. The cover sheet 13 may preferably be formed from a resin film. As will be appreciated, the front and rear side shield members 11d and 12d, and the cover sheet 13, may function to conceal a moving mechanism 33 (which will be described hereinafter) that is disposed between the front and rear portions 11 and 12.

Figure 4:
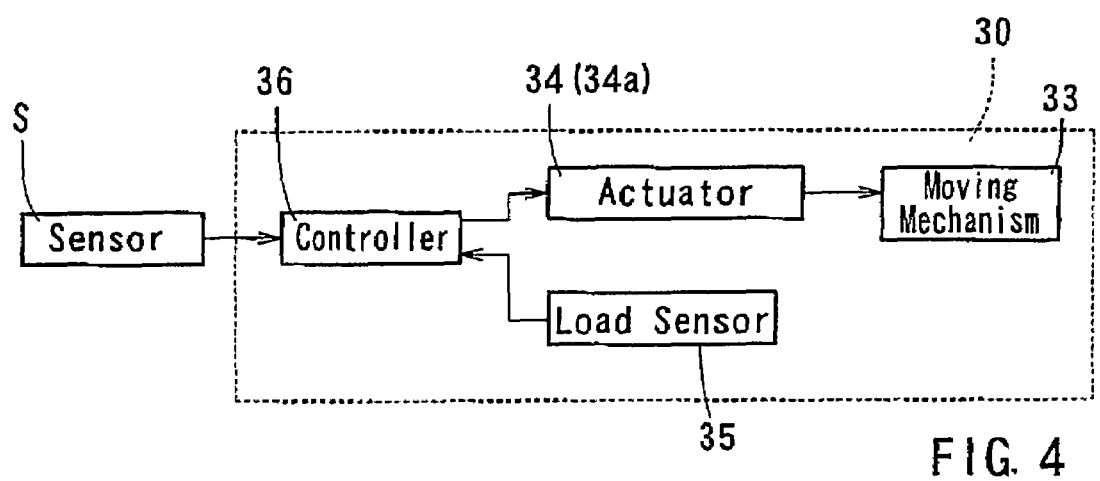
FIG. 4 is a block diagram illustrating a controlling system of the moving mechanism.

The head rest 1 further includes a drive unit 30 for moving the front portion 11 relative to the rear portion 12. As shown in FIG. 4, the drive unit 30 is composed of a linking mechanism or a moving mechanism 33, an actuator 34, a load sensor 35 (i.e., a load detecting device or a supplemental detecting device), and a controller 36. The moving mechanism 33 interconnects the front and rear brackets 11a and 12a of the front and rear portion 11 and 12 such that the front bracket 11a (the front portion 11) can move vertically and back and forth (i.e., horizontally) relative to the rear bracket 12a (the rear portion 12). The actuator 34 has a drive motor 34a (i.e., a drive source) for actuating the moving mechanism 33. The load sensor 35 can detect a load that is applied to the drive motor 34a and generate a signal (i.e., a control signal) representative of the detected load. In this embodiment, the load sensor 35 may preferably be a rotational speed sensor for detecting a rotational speed of the drive motor 34a. As will be recognized, the load applied to the drive motor 34a can be detected by detecting changes in the rotational speed of the drive motor 34a because the drive motor rotational speed may decrease as the load increases. The controller 36 can control the actuator 34 (the drive motor 34a) based on the signal generated by the load sensor 35, thereby controlling the motion of the moving mechanism 33.

Figure 3:
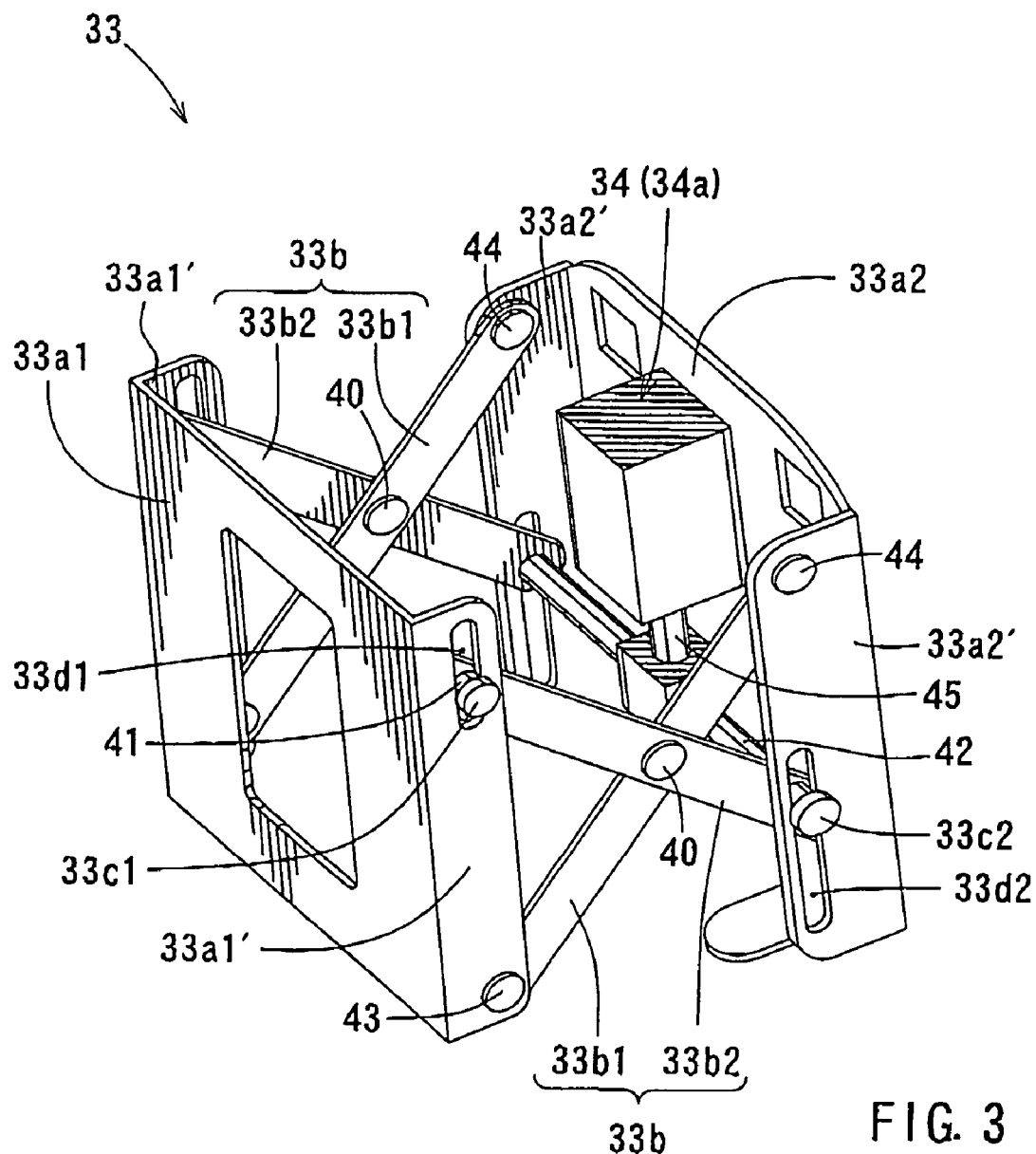
FIG. 3 is a perspective view of the moving mechanism.

As shown in FIGS. 2 and 3, the moving mechanism 33 of the drive unit 30 essentially consists of a rear vertical base plate 33a2, a front vertical base plate 33a1, and a pair of cross bar links 33b. As shown in FIG. 2, the rear vertical base plate 33a2 is connected to the rear bracket 12a of the rear portion 12. As best shown in FIG. 3, the rear base plate 33a2 has side folded portions 33a2' that are folded forwardly in parallel. The lower portions of the side folded portions 33a2' are respectively formed with vertically extending lower guide slots 33d2 that are laterally aligned with each other. Conversely, the front vertical base plate 33a1 is connected to the front bracket 11a of the front portion 11. The front base plate 33a1 has side folded portions 33a1' that are folded rearwardly in parallel. The upper portions of the side folded portions 33a1' are formed with vertically extending upper guide slots 33d1 that are laterally aligned with each other.

As best shown in FIG. 3, each of the cross bar links 33b is composed of outer and inner cross bars 33b2 and 33b1 (i.e., first and second cross bars) that are rotatably interconnected via pivot pin 40. The outer cross bars 33b2 of the respective pairs of cross bar links 33b are rotatably interconnected at their rear and front end portions (i.e., first and second end portions) via a first connector shaft 42 and a second connector shaft 41.

As shown in FIG. 3, the rear end portions of the outer cross bars 33b2 thus connected are respectively rotatably and slidably engaged with the lower guide slots 33d2 formed in the rear base plate 33a2 via guide pins 33c2. Also, the front end portions of the outer cross bars 33b2 thus connected are respectively rotatably and slidably engaged with the upper guide slots 33d1 formed in the front base plate 33a1 via guide pins 33c1. Conversely, the rear end portions of the inner cross bars 33b1 are respectively rotatably connected to the upper portions of the side folded portions 33a2' of the rear base plate 33a2 via pivot pins 44. Also, the front end portions of the inner cross bars 33b1 are respectively rotatably connected to the lower portions of the side folded portions 33a1' of the front base plate 33a1 via pivot pins 43. Thus, the front and rear base plates 33a1 and 33a2 are relatively operably connected via the moving mechanism 33. As a result, as shown in FIG. 2, the front and rear brackets 11a and 12a (the front and rear portions 11 and 12) are relatively operably connected via the moving mechanism 33.

Consequently, the rear end portions (first end portions) of the outer cross bars 33b2 can vertically move relative to the lower portions of the rear base plate 33a2. Similarly, the front end portions (second end portions) of the outer cross bars 33b2 can vertically move relative to the upper portions of the front base plate 33a1. Conversely, the rear end portions (first end portions) of the inner cross bars 33b1 can simply rotate relative to the upper portions of the rear base plate 33a2. Similarly, the front end portions (second end portions) of the inner cross bars 33b1 can simply rotate relative to the lower portions of the rear front plate 33a1.

As shown in FIG. 3, the drive motor 34a of the actuator 34 is attached to the rear base plate 33a2. The drive motor 34a thus disposed is coupled to the first connector shaft 42 via a power transmission rod 45 so as to vertically move the first connector shaft 42. Also, as shown in FIG. 4, the actuator motor 34a is electrically communicated with the controller 36. The controller 36 is electrically communicated with the load sensor 35.

In addition, the controller 36 is connected to a sensor S (i.e., a main detecting device). In this embodiment, the sensor S senses that a passenger sits on the vehicle seat and generates a representative signal (i.e., an initiation signal). The representative signal is transmitted to the controller 36 so that the actuator drive motor 34a is actuated based on the signal, thereby moving the moving mechanism 33. That is, the moving mechanism 33 can be arranged and constructed to be operated when a passenger sits on the vehicle seat. In this embodiment, a seatbelt switch may preferably be used as the sensor S (the main detecting device). Therefore, an on-off signal of the seatbelt switch may preferably be used as the initiation signal.

Next, an operation of the head rest 1 (the main body 10) thus constructed will now be described in detail.

As shown by a broken line in FIG. 2, when the head rest 1 is in a normal condition, the rear portion 12 and the front portion 11 are closed or joined with each other. At this time, the moving mechanism 33 is in an initial condition or retracted condition. In other words, the outer and inner cross bars 33b2 and 33b1 of the cross bar links 33b are in a folded condition. In this condition, the outer cross bars 33b2 are substantially vertically positioned so that the first connector shaft 42 (and the guide pins 33c2) is positioned at the lowermost position within the lower guide slots 33d2 formed in the rear base plate 33a2. Also, the inner cross bars 33b1 are substantially vertically positioned so that the second connector shaft 41 (and the guide pins 33c1) is positioned at the uppermost position within the upper guide slots 33d1 formed in the front base plate 33a1.

When the sensor S (the main detecting device) senses that a passenger is sitting on the vehicle seat, the representative signal (the initiation signal) is transmitted to the controller 36. The controller 36 actuates the actuator drive motor 34a based on the transmitted signal so that the power transmission rod 45 is shifted upwardly. As a result, the first connector shaft 42 connected to the power transmission rod 45 is lifted upwardly. At this time, as shown in FIG. 3, the guide pins 33c2 (the first connector shaft 42) move upwardly along the lower guide slots 33d2. At the same time, the guide pins 33c1 (the second connector shaft 41) move downwardly along the upper guide slots 33d1. Consequently, the outer cross bars 33b2 rotate counterclockwise about the first connector shaft 42 (the guide pins 33c2) while moving upwardly. Depending upon this motion of the outer cross bars 33b2, the inner cross bars 33b1 rotate clockwise around the pivot pins 44. Thus, the outer and inner cross bars 33b2 and 33b1 of the cross bar links 33b can move toward an unfolded condition shown by a solid line in FIG. 2. As a result, the moving mechanism 33 can be shifted toward an extended condition (which corresponds to a position shown by solid lines in FIG. 2) from a retracted condition (which corresponds to a position shown by brokens line in FIG. 2).

When the moving mechanism 33 is shifted from a retracted condition toward an extended condition, the front base plate 33a1 moves from a normal position (which corresponds to a position shown by broken lines in FIG. 2) toward a projected position (which corresponds to a position shown by solid lines in FIG. 2), As will be apparent from comparing the broken lines and the solid lines in FIG. 2, at this time, the front base plate 33a1 moves forwardly and upwardly relative to the rear base plate 33a2. Consequently, as shown by broken lines in FIG. 2, the front portion 11 of the head rest main body 10 is projected forwardly and upwardly relative to the rear portion 12 of the head rest main body 10 toward the passenger head 50. In other words, the front portion 11 is projected forwardly and upwardly relative to the seat back 3a of the vehicle seat 3.

When the projected front portion 11 contacts the passenger head 50 (FIG. 6), the load applied to the drive motor 34a is increased so that the rotational speed of the drive motor 34a may be decreased. The load sensor 35 (the rotational speed sensor) detects the changes of the rotational speed of the drive motor 34a and transmits the control signal to the controller 36. Based on the control signal, the controller 36 stops the drive motor 34a and actuates the drive motor 34a in a reverse direction, thereby appropriately controlling the moving mechanism 33 such that the front portion 11 is moved away from the passenger head 50 for some distance. Thus, the front portion 11 of the head rest main body 10 is positioned in an optimal position relative to the passenger head 50 (FIG. 7) such that the passenger head 50 can be effectively protected if the vehicle actually collides.

Next, a process for controlling the moving mechanism 33 by the controller 36 based upon the initiation signal from the sensor S and the control signal from the load sensor 35 will now be described in detail with reference to FIG. 5. Typically, the controlling process by the controller 36 is started when the ignition switch is turned on. Also, the controlling process is repeated in a desired time interval.

Figure 5:
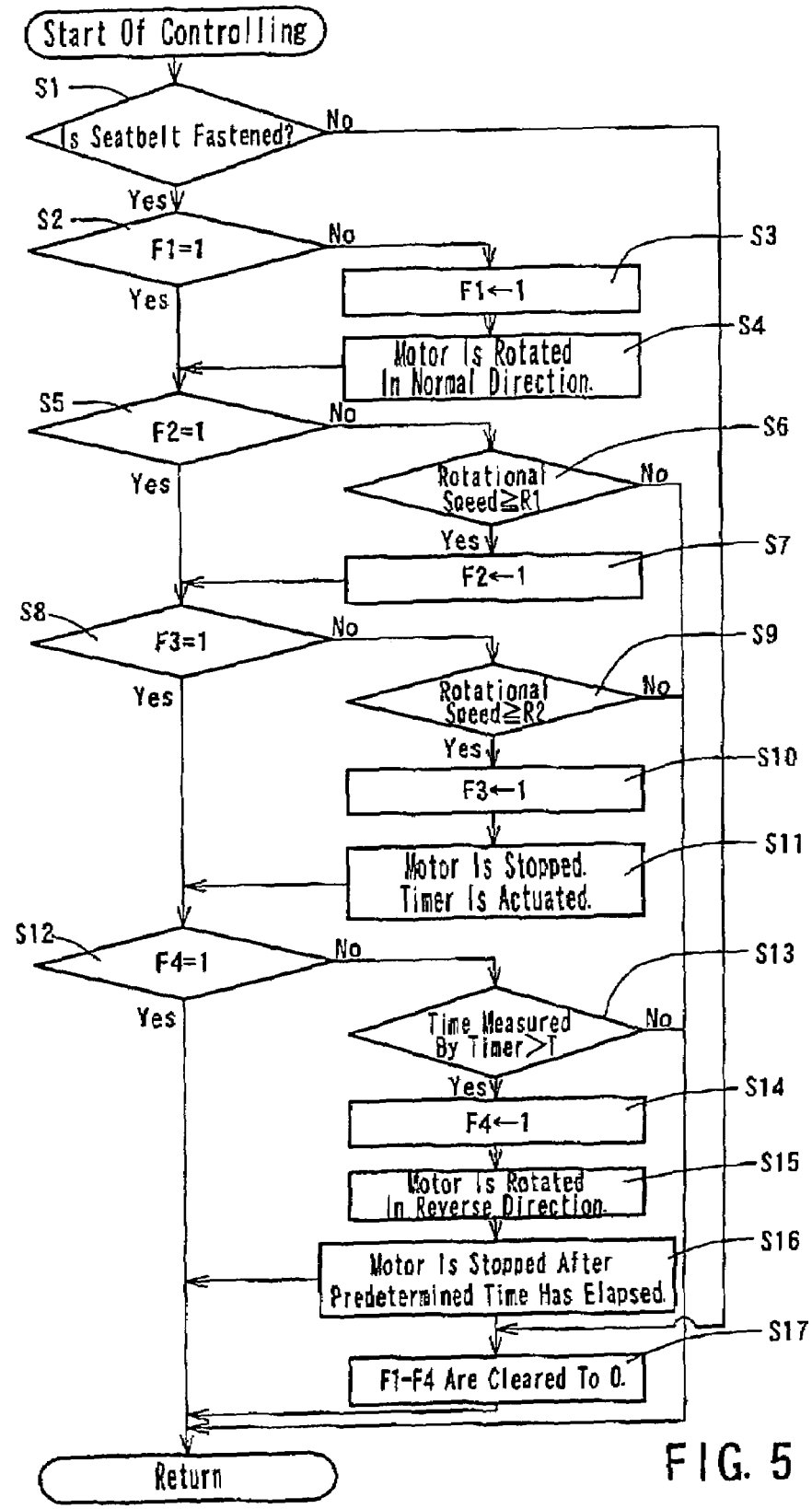
FIG. 5 is a block diagram illustrating a controlling process of the moving mechanism.

In FIG. 5, a reference F1 corresponds to a flag showing as to whether the drive motor 34a of the actuator 34 is rotating. That is, [F1=1] means that the drive motor is rotating. A reference F2 corresponds to a flag showing as to whether the rotational speed of the drive motor 34a is not less than R1 (i.e., as to whether the drive motor 34a reaches to a steady state). That is, [F2=1] means that the rotational speed of the drive motor 34a is not less than R1. A reference F3 corresponds to a flag showing as to whether the rotational speed of the drive motor 34a is not greater than R2 (i.e., as to whether the load is applied to the drive motor 34a upon contacting of the front portion 11 and the passenger head 50). That is, [F3=1] means that the rotational speed of the drive motor 34a is not greater than R2. Further, a reference F4 corresponds to a flag showing as to whether a time measured by a timer that is actuated at the same time as the drive motor 34a is stopped is greater than T (i.e., as to whether a desired time has elapsed after the drive motor 34a is stopped). That is, [F4=1] means that the time measured by the timer is greater than T. Further, each of the flags F1-F4 has a default value of zero (0) when the ignition switch is turned on.

First, in step S1 (i.e., an initial state) the controller 36 determines if the initiation signal from the sensor S (an ON signal of the seatbelt switch) is transmitted to the controller 36 (i.e., if the passenger sits on the vehicle seat and fastens a seatbelt). In step S1, if the initiation signal from the sensor S is not transmitted to the controller 36, the controlling process by the controller 36 is terminated and returned to an initial state (step S1) after the values of F1-F4 are cleared to 0 in step S17. Thus, the controlling process by the controller 36 is restarted. To the contrary, if the initiation signal is transmitted to the controller 36, in step S2 the controller 36 determines if the drive motor 34a is rotating (i.e., if the value of F1 is 1).

In step S2, if the drive motor 34a is not rotating, in step S3 the controller 36 changes the value of F1 from 0 to 1. Thereafter, in step S4 the drive motor 34a is rotated in a normal direction. When the drive motor 34a is rotating, in step S5 the controller 36 determines if the rotational speed of the drive motor 34a is not less than R1 (i.e., if the value of F2 is 1).

In step S5, if the rotational speed of the drive motor 34a does not reach to R1, in step S6 the controller 36 determines if the rotational speed of the drive motor 34a is not less than R1. In step S6, when the rotational speed of the drive motor 34a reaches to R1, the controller 36 changes the value of F2 from 0 to 1 in step S7. Thereafter, in step S8 the controller 36 determines if the rotational speed of the drive motor 34a is not greater than R2 (i.e., if the value of F3 is 1) Further, in step S6, if the rotational speed of the drive motor 34a still does not reach to R1, the controlling process by the controller 36 is terminated and returned to an initial state (step S1) so that a new controlling process is started. As will be recognized, when the controlling process by the controller 36 is returned from step S6 to step S1, the new controlling process advances from step S1 to step S5 via step S2 without passing through steps S3 and S4 because the value of F1 is changed to 1.

In step S8, if the rotational speed of the drive motor 34a is greater than R2, in step S9 the controller 36 further determines if the rotational speed of the drive motor 34a is not greater than R2. In step S9, if the rotational speed of the drive motor 34a is not greater than R2, the controller 36 changes the value of F3 from 0 to 1 in step S10. At the same time, in step S11 the drive motor 34a is stopped and the timer is actuated in order to determine the time that has elapsed after the drive motor 34a is stopped. Thereafter, in step S12 the controller 36 determines if the elapsed time after stopping of the drive motor 34a is greater than T (i.e., if the value of F4 is 1). Further, in step S9, if the rotational speed of the drive motor 34a does not still reach to R2, the controlling process by the controller 36 is terminated and returned to an initial state (step S1) so that a new controlling process is started. As will be recognized, when the controlling process by the controller 36 is returned from step S9 to step S1, the new process advances from step S1 to step S8 via steps S2 and S5 without passing through steps S3, S4, S6 and S7 because each of the values of F1 and FZ is changed to 1.

In step S12, if the time measured by the timer is not greater than T, in step S13 the controller 36 determines if the time measured by the timer is greater than T. In step S13, if the time measured by the timer is greater than T, the controller 36 changes the value of F4 from 0 to 1 in step S14. Thereafter, in step S15 the drive motor 34a is rotated in the reverse direction so as to move the front portion 11 away from the passenger head 50. Thereafter, in step S16 the drive motor 34a is stopped when a predetermined time has elapsed after the drive motor 34a is rotated in the reverse direction. As a result, the front portion 11 is moved away from the passenger head 50 over a desired distance so as to be positioned in the optimal position relative to the passenger head 50 (FIG. 7). Thus, the controlling process by the controller 36 is terminated. Further, in step S13, if the time measured by the timer is still not greater than T, the controlling process by the controller 36 is terminated and returned to an initial state (step S1) so that a new controlling process is started. As will be recognized, when the controlling process by the controller 36 is returned from step S13 to step S1, the new process advances from step S1 to step S12 via steps S2, S5 and S8 without passing through steps S3, S4, S6, S7 and S9-S11 because each of the values of F1-F3 is changed to 1.

Further, in the controlling process, when a desired time has elapsed after the controller 36 determines that the initiation signal from the sensor S is transmitted thereto, the moving mechanism 33 is automatically returned to an initial condition so that the head rest 1 is restored to the normal condition, as shown by broken lines in FIG. 2. At this time, each of the values of F1-F4 is cleared to 0.

According to this embodiment, the front portion 11 of the head rest main body 10 can be easily positioned in an optimal position relative to the passenger head 50 without utilizing proximity detectors (e.g., contact or non-contact type detectors) that can detect when the front portion 11 contacts or comes closer to the passenger head 50 and generate representative signals. Also, the front portion 11 can be effectively prevented from excessively projecting forwardly toward the passenger head 50. Therefore, the front portion 11 can be prevented from pressing against the passenger head 50.

Naturally, various changes and modifications may be made to the present teachings without departing from the scope of the invention. For example, in this embodiment, although the rotational speed sensor for detecting the rotational speed of the drive motor 34a is used as the load sensor 35 (the load detecting device), various types of sensors can be used as the load sensor 35. Examples of the load sensor 35 may includes a torque sensor, a current sensor, and a voltage sensor for the drive motor 34a. Also, in this embodiment, the seatbelt switch is used as the sensor S. However, a special switch can be additionally provided so that the front portion 11 can be moved by operating the switch, if required.

Further, in this embodiment, the moving mechanisms 33 is arranged and constructed to be operated when the passenger sits on the vehicle seat. However, the moving mechanism 33 can be arranged and constructed to be operated when a vehicle collision is sensed or predicted. In such a case, a sensor for predicting the vehicle collision or a sensor for sensing the vehicle collision may preferably be used as the sensor S (the main sensing device) so that a signal from such a sensor can be used as the initiation signal instead of the on-off signal of the seatbelt switch. Therefore, in the step Si in FIG. 5, the controller 36 determines as to whether a vehicle collision is sensed or predicted.

Furthermore, in this embodiment, the optimal position of the front portion 11 of the head rest main body 10 corresponds to the position shown in FIG. 7. However, the optimal position is not limited to such a position. In other words, the optimal position of the front portion 11 can be appropriately changed, if necessary.

Moreover, the drive motor 34a (the drive source) of the actuator 34 includes, for example, but is not limited to, a DC motor, an AC motor, a pulse motor, a linear motor or other such motors. Also, the drive motor 34a can be replaced with a hydraulic or pneumatic device (e.g., a hydraulic cylinder), if necessary. Generally, a drive source that is susceptible to the load applied thereto is more suitable.

Additional examples of relevant head rests are found in U.S. patent application Ser. No. 11/153,262, the contents of which are hereby incorporated by reference.

The invention claimed is:

1. A head rest of a vehicle seat, comprising:
    a head support portion for supporting a head of a passenger; and
    a drive unit for moving the head support portion, the drive unit having a moving mechanism that is arranged and constructed to move the head support portion toward and away from the passenger head, an actuator for actuating the moving mechanism, a load detecting device that can detect a load applied to the actuator and generate a control signal representative of the detected load, and a controller that can control the actuator so as to control the moving mechanism,
    wherein the controller controls the moving mechanism so as to move the head support portion from a retracted position toward the passenger head, and wherein the controller controls the moving mechanism based on the control signal so as to stop the motion of the head support portion,
    wherein the controller controls the moving mechanism so as to move the head support portion away from the passenger head over a desired distance after the head support portion is stopped due to contact with the passenger head, and
    wherein the desired distance is determined such that the head support portion can be moved to and stopped at a stopped position between a passenger head contacting position and the retracted position, such that the stopped position is different from the retracted position.

2. The head rest as defined in claim 1, wherein the actuator comprises a drive motor, and wherein the control signal comprises a signal corresponding to a rotational speed of the drive motor.

* * * * *

UNITED STATES PATENT AND TRADEMARK OFFICE
CERTIFICATE OF CORRECTION

| | | |
|---|---|---|
| PATENT NO. | : 7,717,507 B2 | Page 1 of 1 |
| APPLICATION NO. | : 11/285770 | |
| DATED | : May 18, 2010 | |
| INVENTOR(S) | : Toda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 195 days.

Signed and Sealed this

Twenty-sixth Day of October, 2010

David J. Kappos
*Director of the United States Patent and Trademark Office*